United States Patent

Hitomi

[11] Patent Number: 6,056,222
[45] Date of Patent: May 2, 2000

[54] SPINNING REEL ANTI-REVERSE DEVICE

[75] Inventor: Yasuhiro Hitomi, Hashimoto, Japan

[73] Assignee: Shimano, Inc., Japan

[21] Appl. No.: 09/315,362

[22] Filed: May 17, 1999

Related U.S. Application Data

[63] Continuation of application No. 08/978,292, Nov. 25, 1997, which is a continuation of application No. 08/554,224, Oct. 8, 1995, abandoned.

[51] Int. Cl.⁷ .................................................. A01K 89/02
[52] U.S. Cl. ............................ 242/247; 242/299; 192/45
[58] Field of Search ..................................... 242/247, 299, 242/301; 192/45; 188/82.3, 82.4

[56] References Cited

U.S. PATENT DOCUMENTS

| | | | |
|---|---|---|---|
| 4,989,705 | 2/1991 | Kashio et al. | 192/45 |
| 5,370,330 | 12/1994 | Uehara et al. | 242/247 |
| 5,485,969 | 1/1996 | Yamaguchi | 242/247 |
| 5,503,343 | 4/1996 | Hirano et al. | 242/247 |
| 5,695,031 | 12/1997 | Kurita et al. | 192/45 |
| 5,779,015 | 7/1998 | Murata | 192/45 X |

FOREIGN PATENT DOCUMENTS 573992  12/1993  European Pat. Off. ............... 242/247

*Primary Examiner*—Donald P. Walsh
*Assistant Examiner*—Emmanuel M. Marcelo
*Attorney, Agent, or Firm*—Jeffer, Mangels, Butler & Marmaro LLP

[57] ABSTRACT

A device for preventing the reverse rotation of a spinning reel includes: an outer ring having an outer circumferential portion; an inner ring which is capable of rotating relative to the outer ring; a plurality of rollers which are installed between the outer ring and the inner ring, and which are capable of assuming operating positions in which the rollers engage with the inner and outer rings, and non-operating positions in which the rollers are positioned between the inner and outer rings; a switching plate which has a disk-form main body and a plurality of projecting elements which project in the axial direction from the main body and which are disposed between the plurality of rollers; and an operating mechanism which moves the plurality of rollers between the operating positions and the non-operating positions by causing the switching member to rotate circumferentially.

11 Claims, 8 Drawing Sheets

SPINNING REEL ANTI-REVERSE DEVICE

This is a continuation of application Ser. No. 08/978,292 filed Nov. 25, 1997, which is a continuation of application Ser. No. 08/554,224 filed Oct. 8, 1995 abandoned.

FIELD OF THE INVENTION

The present invention concerns a reverse rotation prevention device, and specifically concerns a device for preventing the reverse rotation of a spinning reel, which is installed in a spinning reel in which a rotor that is used to guide a fishing line onto a spool is mounted on a reel main body so that the rotor is free to rotate, and which is used to prevent the reverse rotation of the rotor in the line pay-out direction.

BACKGROUND OF THE INVENTION

Generally, spinning reels have a reel main body, a rotor which is supported on the reel main body so that the rotor is free to rotate, and a spool around whose outer circumference a fishing line is wound. The rotor has a first arm and a second arm which are installed facing each other on opposite sides of the axis of rotation of the rotor. A bail is installed on the tip ends of the two arms via bail supporting members so that the bail is free to pivot. Furthermore, a line roller is installed on the tip end of one of the bail supporting members. When the fishing line is taken up, the fishing line is guided onto the outer circumference of the spool by the bail and line roller.

In such spinning reels, a reverse rotation prevention device is installed in order to prevent reverse rotation of the rotor in the line pay-out direction during casting and line take-up. This reverse rotation prevention device is formed by a one-way clutch which is installed between the reel main body and the rotor. Such a device has an outer ring which is fastened to the reel main body side, an inner ring which is capable of rotation relative to the outer ring, and which is fastened to the rotor side, and a plurality of rollers which are installed between the outer ring and the inner ring. These rollers are held by a retainer, and the movement of the rollers in the axial direction and circumferential direction is restricted by the retainer.

In conventional reverse rotation prevention devices using a one-way clutch, a plurality of accommodating grooves oriented in the radial direction are formed in the retainer, and rollers are installed in these grooves. In such a reverse rotation prevention, the device must be assembled by inserting the rollers from outside the circumference of the retainer. In other words, the rollers must be installed from the radial direction. On the other hand, the outer ring, retainer and inner ring, etc., can all be installed from the axial direction.

Thus, in such a conventional reverse rotation prevention device, it is not possible to install all of the constituent members from one direction. Accordingly, automation of the assembly process is difficult.

Furthermore, not only rollers, but also leaf springs, etc., which are used to drive the rollers in one direction, are installed in the grooves of the retainer. As a result, the number of rollers that can be accommodated in the retainer is limited, so that there are limits to the capacity of the device.

One object of the present invention is to facilitate automation of the assembly process.

Another object of the present invention is to increase the capacity of the one-way clutch constituting the reverse rotation preventing device.

SUMMARY OF THE PREFERRED EMBODIMENTS

In accordance with one aspect of the present invention, there is provided a device for preventing reverse rotation of a spinning reel. The device is adapted to be installed in a spinning reel in which a rotor that is used to guide a fishing line onto a spool is mounted on a reel main body so that the rotor is free to rotate, and is useful to prevent the reverse rotation of the rotor in the line pay-out direction. The device includes an outer ring, having a circumferential portion, which preferably is mounted on the rear, or reel main body, side of the reel main body, an inner ring which is capable of rotating relative to the outer ring, and which is connected to the front, or rotor, side of the reel main body, a plurality of rollers, a switching member, and an operating mechanism.

The plurality of rollers are installed between the outer ring and inner ring, and are capable of assuming operating positions in which the rollers engage with the rings, and non-operating positions in which the rollers are positioned between the rings. The switching member is a member which has a disk-form main body and a plurality of projecting elements which project in the axial direction from the main body and which are disposed between the plurality of rollers, and which allows the plurality of rollers to be inserted between the plurality of projecting elements from a direction parallel to the axis of rotation of the rotor. The operating mechanism is a mechanism which moves the plurality of rollers between the operating positions and the non-operating positions by causing the switching member to rotate in the circumferential direction. Since the outer ring is mounted on the reel main body side (fixed side), rotation of the inner ring (i. e., of the rotor) is prevented in one direction. On the other hand, when the switching member is caused to rotate so that the plurality of rollers are moved into their non-operating positions, the rollers move into the space between the two rings. In this state, reverse rotation of the rotor is permitted.

Here, the plurality of rollers are not held in a retainer. Specifically, the rollers can be inserted between the plurality of projecting elements of the switching member from the axial direction. As a result, all of the members constituting the present device can be installed from the axial direction, so that automation of the assembly process is facilitated.

According to a preferred embodiment of the present invention, the device further includes a frame which is adapted to be fastened to the reel main body. The frame supports the outer circumferential portion of the outer ring. A plurality of driving members which have supporting elements are supported on the frame, and driving elements extend inward from the supporting elements and drive the plurality of rollers toward their operating positions. The tip ends of the driving members extend inward from the supporting elements and drive the rollers.

Here, only the tip end portions of the driving members are positioned on the same circumference as the rollers. The supporting elements of the driving members are located to the outside of the rollers. As a result, the space which can be used for the installation of the rollers is increased, so that the number of rollers can be increased, or the diameter of said rollers can be increased. Accordingly, the capacity of the one-way clutch containing the rollers can easily be increased.

According to another preferred embodiment of the present invention, a cover is used to regulate the movement of the plurality of rollers in the axial direction when the rollers are inserted between the plurality of projecting parts of the switching member. Accordingly, the positioning of the rollers can be accomplished by means of a simple construction. Furthermore, the rollers can easily be removed in the axial direction by removing the cover.

According to a further preferred embodiment, the cover is attached to the frame, and the device further has a sealing member that is installed between the cover and the frame so that the sealing member covers the gap between the outer ring and the frame. The gap between the outer ring and the frame is sealed by this sealing member, so that any deleterious effects that might by caused by the accumulation of sea water, etc., between the two elements can be prevented.

In accordance with another aspect of the present invention, a device is provided for preventing the reverse rotation of a spinning reel. The device adapted to be installed in a spinning reel in which a rotor that is used to guide a fishing line onto a spool is mounted on a reel main body so that the rotor is free to rotate, and is useful to prevent the reverse rotation of the rotor in the line pay-out direction. The inventive device is equipped with an outer ring having an outer circumferential portion, a frame which supports the outer circumferential portion of the outer ring and which is fastened to the reel main body, an inner ring which is capable of rotating relative to the outer ring, and which is connected to the rotor, a plurality of rollers which are installed between the outer ring and inner ring, and which are capable of assuming operating positions in which the rollers engage with the rings, and non-operating positions in which the rollers are positioned between the rings, a switching member, a plurality of driving members, and an operating mechanism. The switching member is a member which has a disk-form main body and a plurality of projecting elements which project in the axial direction from the main body and which are inserted between the plurality of rollers. The switching member is used to move the plurality of rollers in the circumferential direction. The plurality of driving members are members which have supporting elements which are supported on the frame, and driving elements which extend inward from the supporting elements and which drive the plurality of rollers toward the operating positions. The operating mechanism is a mechanism which moves the plurality of rollers between the operating positions and the non-operating positions by causing the switching member to rotate in the circumferential direction.

The plurality of rollers are switched between their operating positions and non-operating positions by means of the switching member as described above, thus controlling the rotation of the rotor.

Here, the plurality of rollers are driven toward their operating positions by the driving members. Furthermore, the supporting elements of the driving members are supported on the frame which is installed on the outside of the outer ring, and the tip ends of the driving members which extend inward from the supporting elements drive the rollers. Accordingly, the space which can be used for the installation of the rollers is increased, so that the number of rollers can be increased, or the diameter of the rollers can be increased. Thus, the capacity of the one-way clutch can easily be increased.

In another preferred embodiment of the invention, the driving members are torsion coil springs consisting of coils which are supported on the frame, and arms which extend inward from the coil parts so that the tips of the arms contact the rollers.

According to yet another preferred embodiment, the driving members are constructed from torsion coil springs. As a result, the driving members can be made simple and small in size.

In a further preferred embodiment, the plurality of rollers are clamped between the driving members and the projecting elements of the switching member when the rollers are positioned in their non-operating positions, so that the rollers do not contact the inner ring.

In still another preferred embodiment, the plurality of rollers are clamped between the driving members and the projecting elements of the switching member when the rollers are positioned in their non-operating positions, so that the rollers do not contact the inner ring. As a result, the resistance during idling is reduced. Furthermore, noise is also reduced.

According to an additional preferred embodiment, the width of the outer ring in the axial direction is smaller than the width of the rollers in the axial direction. As a result, a construction can be used in which, for example, the outer ring is accommodated inside the frame, or in which the driving members are positioned to the outside of the rollers (with respect to the circumferential direction), so that only the driving elements of the driving members contact the rollers.

According to yet another preferred embodiment, the operating mechanism includes an operating member which has an engaging element that engages with a portion of the switching member, and the operating member is installed within the outer diameter of the outer ring. As a result, dimensions of the reel as a whole in the direction of height can be reduced. Or, the one-way clutch as described herein (with an increased capacity) can be used even in a relatively small reel.

According to a further aspect of the present invention, there is provided a spinning reel including: a reel main body; a rotor having a cylindrical element; a spool affixed to the rotor; a rotor driving mechanism including a handle, a driving gear, and a pinion gear to which the rotor is affixed; and disposed within the cylindrical element of the rotor, a device as defined herein for preventing the reverse rotation of the rotor. The outer ring of the device is mounted on the reel main body, and the inner ring is mounted on the pinion gear.

In a preferred embodiment, the device includes a frame as described herein, and the frame is affixed to the reel body.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the figures, like elements are numbered alike throughout.

DETAILED DESCRIPTION OF THE PREFERRED EMBODIMENTS

Figure 1:
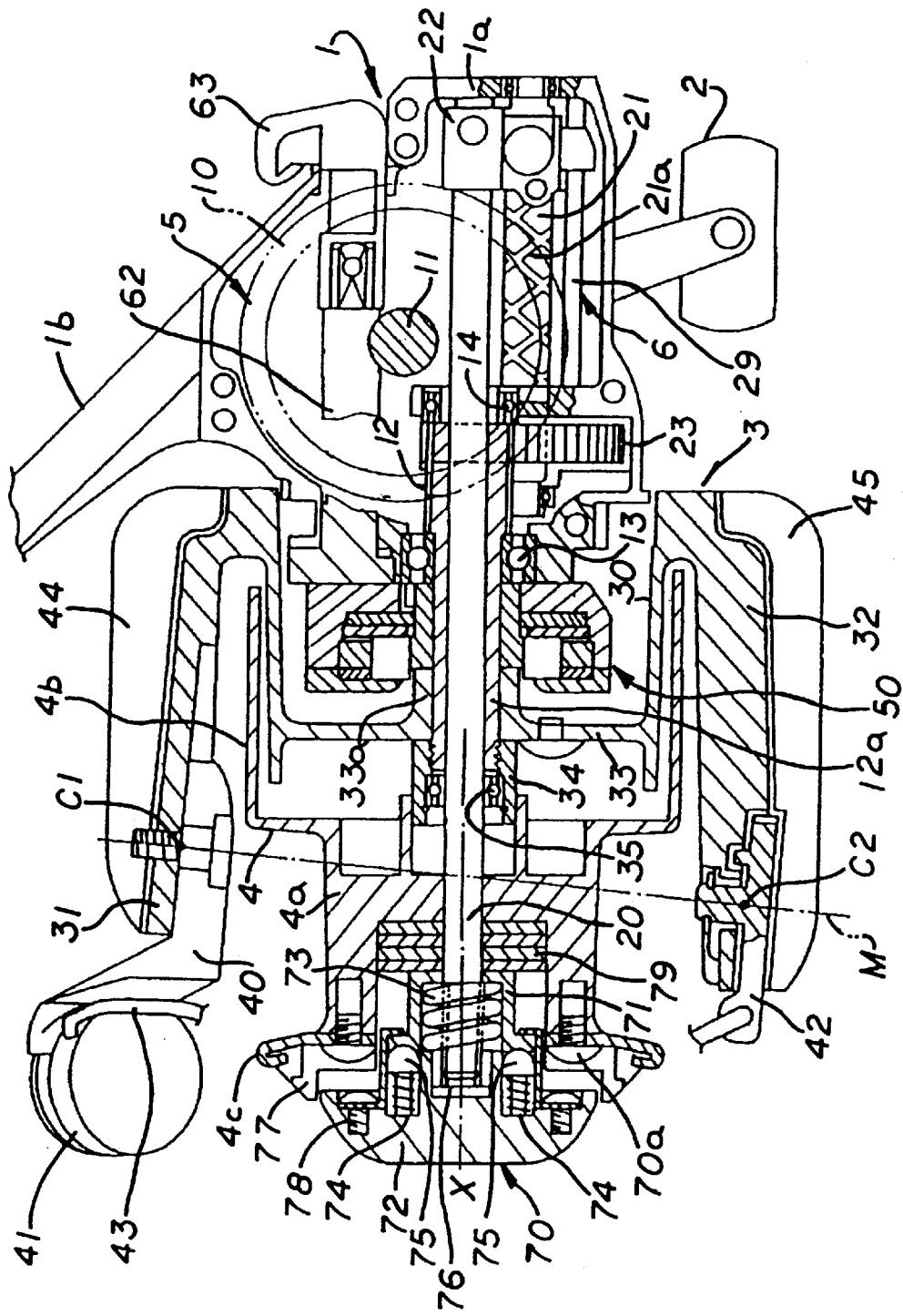
FIG. 1 is a sectional front view of a spinning reel constructed according to one embodiment of the present invention.
Figure 2:
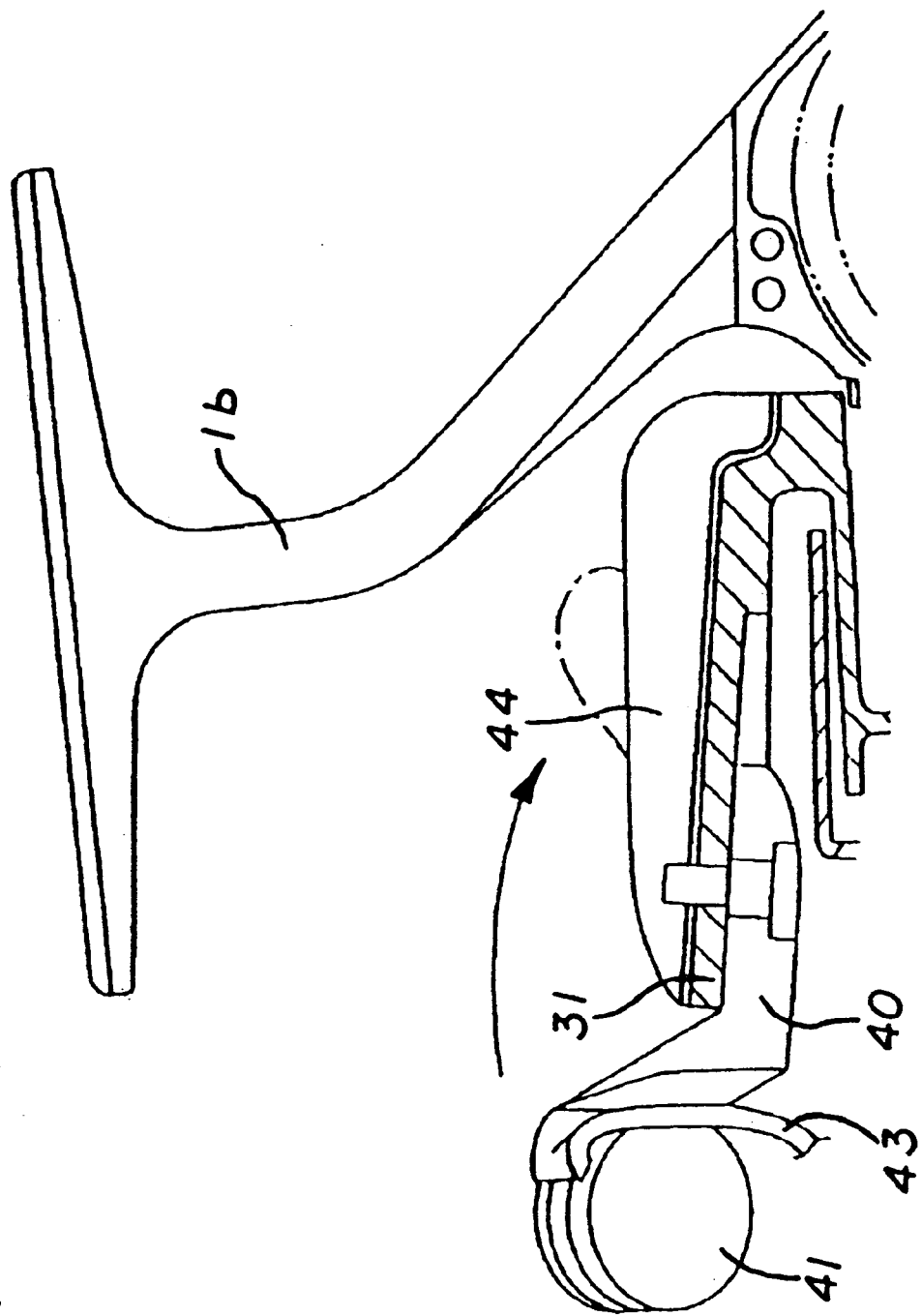
FIG. 2 shows the fishing rod attachment part of the foregoing spinning reel.
Figure 3:
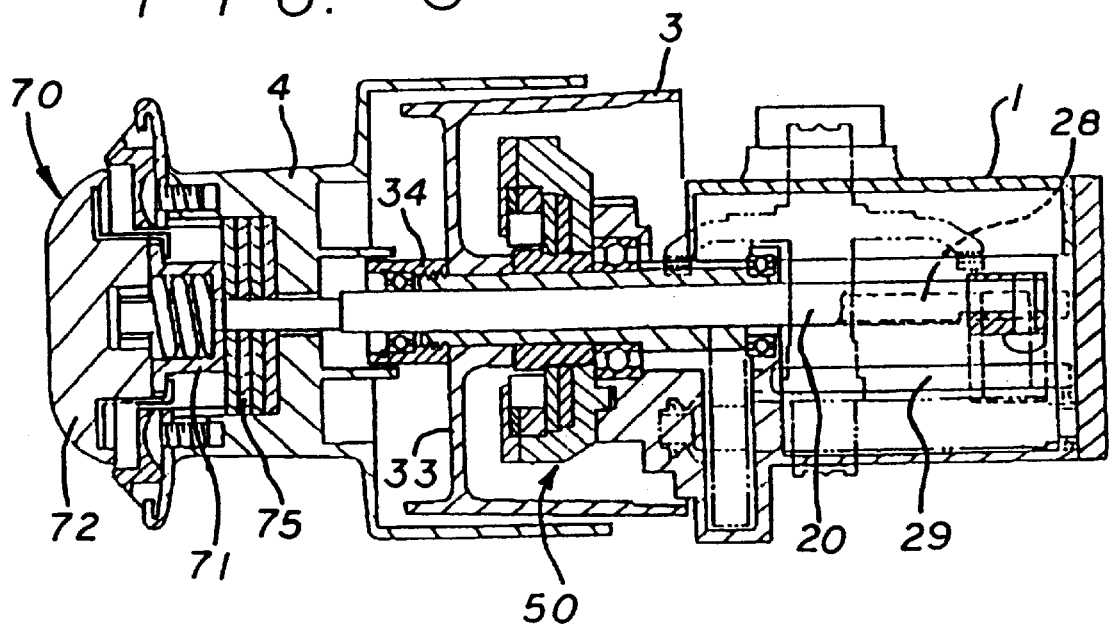
FIG. 3 is a sectional plan view of the spinning reel.

The spinning reel shown in FIGS. 1 through 3, which constitutes one embodiment of the present invention, is equipped with a reel main body 1 which has a handle 2, a rotor 3 which is supported on the front portion of reel main body 1 so that rotor 3 is free to rotate, and a spool 4 which is installed on the front portion of the rotor 3, and which takes up the fishing line.

The reel main body 1 has a body 1a, and an attachment element 1b which is used to attach the spinning reel to the fishing rod is formed on the upper portion of said body 1a. A rotor driving mechanism 5 which is used to cause rotation of the rotor 3, and a level winding mechanism 6 which is used to wind the fishing line uniformly on the spool 4 by causing the spool 4 to move backward and forward along the axis of rotation X, are installed inside the body 1a.

The rotor driving mechanism 5 has a driving gear 10 which rotates together with a shaft 11 to which the handle 2 is fastened, and a pinion gear 12 which engages with driving gear 10. The pinion gear 12 is formed in a tubular shape; the front portion 12a of pinion gear 12 extends toward the spool 4 through the central portion of the rotor 3. Furthermore, a screw part is formed on the tip end of pinion gear 12. The intermediate portion and rear end portion of the pinion gear 12 (with respect to the axial direction) are supported on the reel main body 1 via respective bearings 13 and 14 so that pinion gear 12 is free to rotate.

The level winding mechanism 6 is a mechanism which is used to cause a spool shaft 20 fastened to the central portion of the spool 4 to move in the axial direction, thus causing the spool 4 to move in the same direction. This level winding mechanism 6 has a screw shaft 21 which is installed beneath the spool shaft 20, a slider 22 which moves back and forth along screw shaft 21, and an intermediate gear 23 which is fastened to the tip end of the screw shaft 21. The screw shaft 21 is installed parallel to the spool shaft 20, and is supported on the body 1a so that screw shaft 21 is free to rotate. Furthermore, helical grooves 21a are formed in the outer circumferential portion of the screw shaft 21. The rear end of the spool shaft 20 is fastened to the slider 22. Furthermore, the intermediate gear 23 engages with the pinion gear 12.

Figure 4:
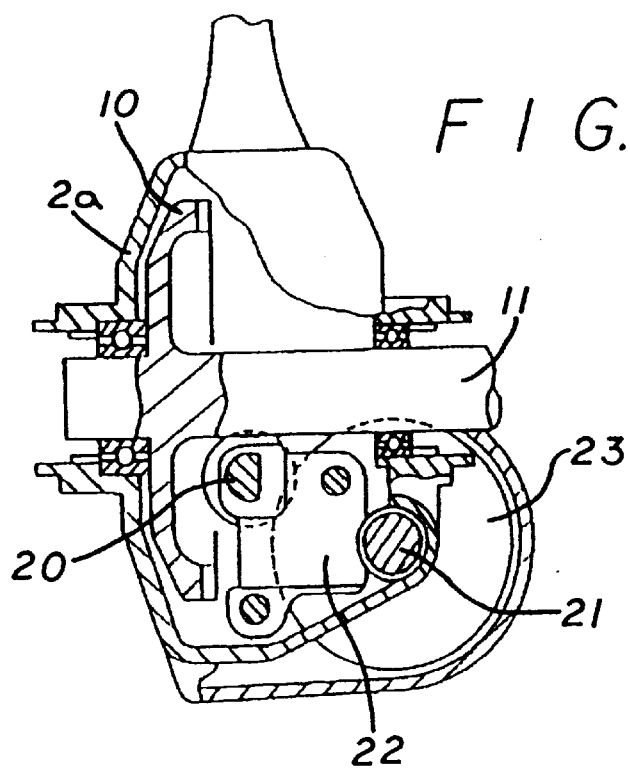
FIG. 4 is a sectional back view of the spinning reel.
Figure 5:
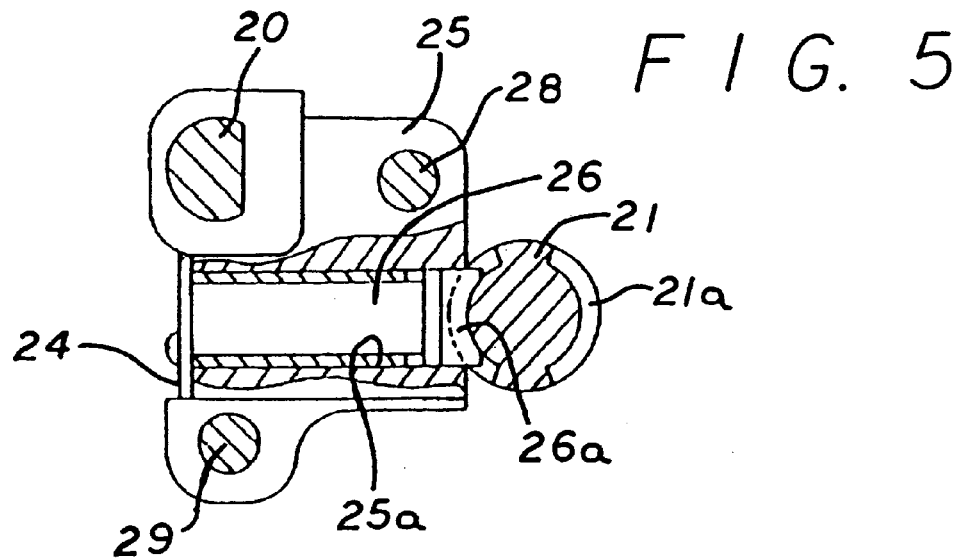
FIG. 5 is a partially sectional structural diagram of the slider.

As is shown in FIGS. 4 and 5, the slider 22 has a slider main body 25 and an engaging member 26 which is accommodated inside slider main body 25.

The slider main body 25 is mounted on two guide shafts 28 and 29 installed parallel to the spool shaft 20, so that slider main body 25 is free to slide. Since the slider main body 25 is guided by these two guide shafts 28 and 29, tilting of the slider main body 25 during sliding is prevented. As a result, it is not necessary to form the slider main body 25 in a shape which covers the entire circumference of the screw shaft 21 as in the case of a conventional slider main body.

Accordingly, the slider main body 25 in the present embodiment is formed in such a shape that slider main body 25 faces only one side of the screw shaft 21. Thus, the amount of projection of the slider main body 25 toward the other side of the screw shaft 21 is reduced. As a result, the size of the reel main body can be reduced. For the same reason, it is not necessary to install the screw shaft 21 and slider 22 at the same time. Accordingly, assembly is facilitated.

Furthermore, a lateral hole 25a is formed in the slider main body 25 so that said hole 25a is perpendicular to the screw shaft 21. The engaging member 26 is inserted into this hole 25a so that engaging member 26 is free to slide. An engaging element 26a which engages with the grooves 21a of the screw shaft 21 is formed on the tip end of the engaging member 26. A covering member 24 is fastened to one end of the hole 25a in the slider main body 25.

The rotor 3 has a cylindrical element 30, as well as a first arm 31 and second arm 32 which are installed facing each other on the sides of the cylindrical element 30. The cylindrical element 30 and both arms 31 and 32 are formed as an integral unit. In the alternative, the cylindrical element 30 and the arms 31 and 32 can be formed as separate elements. Arms 31 and 32 can then be affixed to cylindrical element 30.

A front wall 33 is formed in the front portion of the cylindrical element 30, and a boss 33a is formed in the central portion of front wall 33. A through-hole is formed in the central portion of boss 33a, and the spool shaft 20 and front portion 12a of the pinion gear 12 pass through this through-hole. A nut 34 is disposed on the front side of the front wall 33; this nut 34 is screw-engaged with the tip-end screw part of the pinion gear 12. A bearing 35 which supports the spool shaft 20 so that spool shaft 20 is free to rotate is installed on the inner circumferential portion of the nut 34.

A first bail supporting member 40 is attached to the inner circumferential side of the tip end of the first arm 31 so that first bail supporting member 40 is free to pivot. A line roller 41 which is used to guide the fishing line onto the spool 4 is mounted on the tip end of the first bail supporting member 40. Furthermore, a second bail supporting member 42 is mounted on the outer circumferential side of the tip end of the second arm 32 so that second bail supporting member 42 is free to pivot. This second bail supporting member 42 can also be caused to function as a balancer (which eliminates any imbalance during rotation caused by the first bail supporting member 40 and line roller 41) by, e.g., forming second bail supporting member 42 from a material which has a larger specific gravity than the other parts. A bail 43 is installed between the line roller 41 on the tip end of the first bail supporting member 40 and the second bail supporting member 42. Thus, since the first bail supporting member 40 is mounted on the inner circumferential side of the first arm 31, the radius of rotation of the first bail supporting member 40 is reduced, so that there is less likelihood of first bail supporting member 40 contacting the hand that holds the fishing rod. Accordingly, the spool and fishing rod can be installed closer together, so that an overall reduction in size is possible. Furthermore, for the same reason, the radius of rotation is reduced so that any imbalance during rotation can be suppressed more easily.

Furthermore, optional covers 44 and 45 are attached to the outer circumferential sides of the respective arms 31 and 32. The surfaces of these covers 44 and 45 have smooth continuous shapes in the longitudinal direction and circumferential direction. Accordingly, catching of the fishing line can be prevented.

Here, both bail supporting members 40 and 42 are free to pivot about a single pivoting axis M. Furthermore, if the point where the pivoting axis M intersects with the first bail supporting member attachment surface of the first arm 31 is taken as the pivoting center C1, and the point where the pivoting axis M intersects with the second bail supporting member attachment surface of the second arm 32 is taken as the pivoting center C2, then the pivoting center C2 is positioned further forward than the pivoting center C1. In other words, the pivoting axis M is inclined with respect to the axis of rotation X. Furthermore, the bail supporting members 40 and 42 are installed so that the pivoting planes of bail supporting members 40 and 42 are perpendicular to the pivoting axis M.

Figure 6:
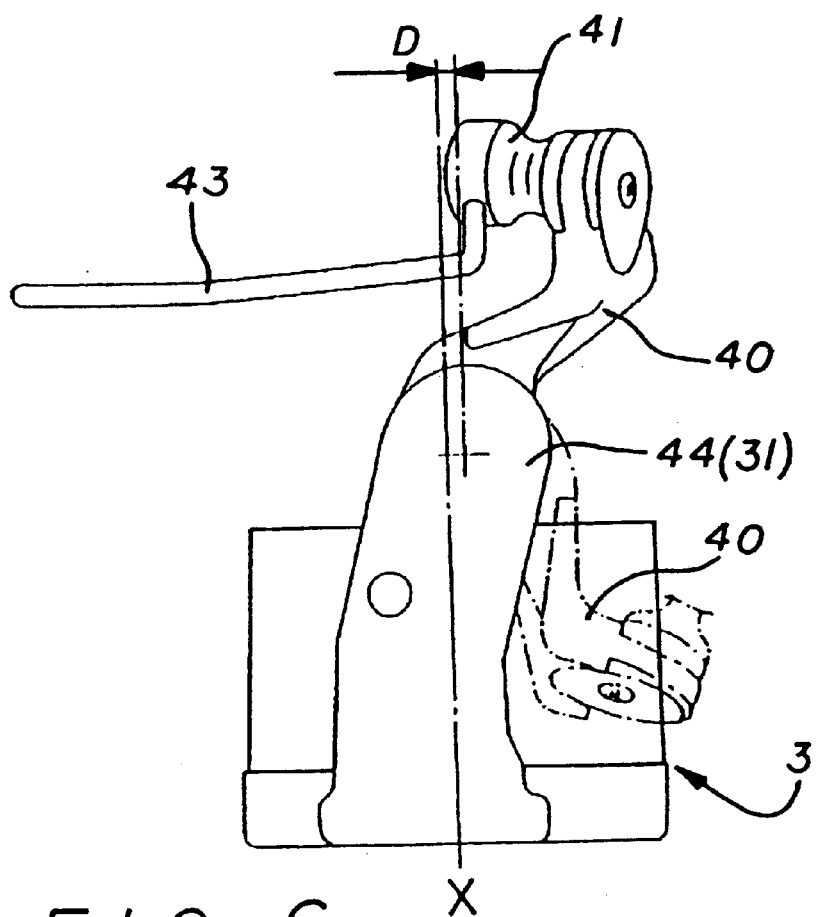
FIG. 6 is a side view of the rotor.
Figure 7:
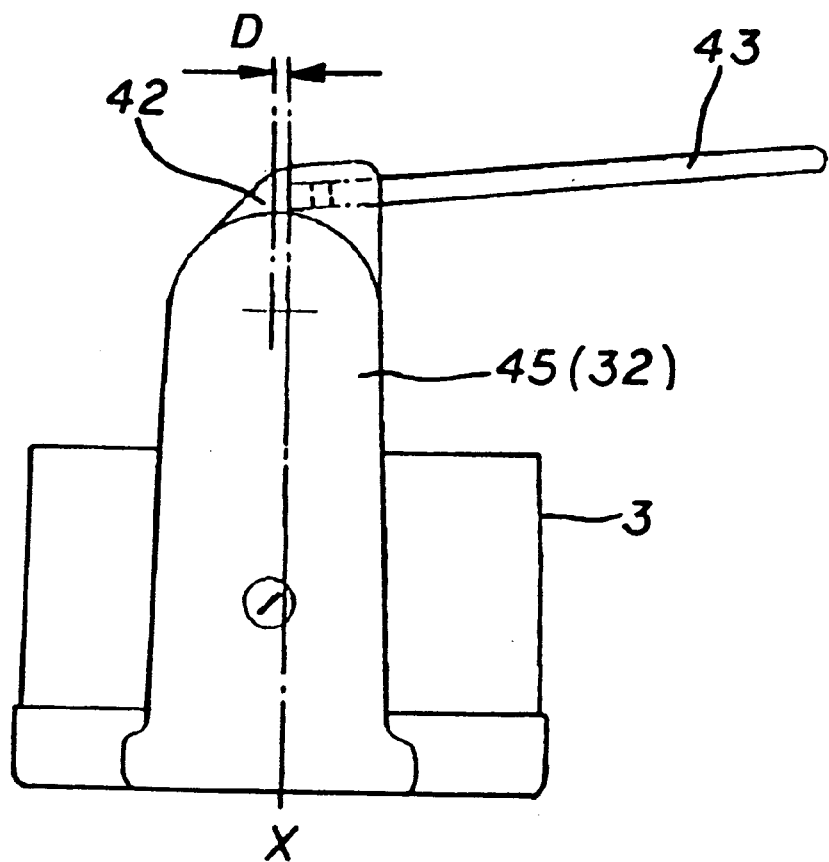
FIG. 7 is a view of the other side of the rotor.

Furthermore, as is shown in FIGS. 6 and 7, the rear portion of the first arm 31 (on the reel main body side) is offset from the axis of rotation X toward the side of the bail in the line retrieving position. Furthermore, first arm 31 is inclined in the opposite direction (i. e., toward the side of the bail in the line releasing position) from the central portion of arm 31 forward (in the axial direction). Thus, as a result of the rear portion of the first arm 31 being offset toward the side of the bail in the line retrieving position, interference between the bail 43 and the first arm 31 is reduced when the bail 43 is thrown over into the line releasing position (as indicated by the one-dot chain line in FIG. 6). Furthermore, any imbalance during rotation caused by the first bail supporting member 40 and line roller, etc., can be suppressed. Meanwhile, as is shown in FIG. 7, the second arm 32 extends more or less in a straight line overall. In addition, the pivoting centers of the first and second bail supporting members 40 and 42 are offset from the axis of rotation X toward the side of the bail in the line releasing position by a distance of D. As a result, any imbalance during rotation that might be caused by the bail 43 is suppressed.

A mechanism 50 which prevents reverse rotation of the spool 4 is installed inside the cylindrical element 30 of the rotor 3. As is shown in FIGS. 8 through 11, this reverse rotation preventing mechanism 50 has a frame 51 which is fastened to the reel main body 1 by fastening means such as screws 49, a roller type one-way clutch 52 which is accommodated inside frame 51, and an operating mechanism 53 which switches one-way clutch 52 between an operating state and a non-operating state.

The one-way clutch 52 has an outer ring 55 which is mounted on the frame 51 so that relative rotation between outer ring 55 and frame 51 is impossible, an inner ring 56 which is fastened to the outer circumference of the forward cylindrical part of the pinion gear 12, and a plurality of rollers 57. The outer ring 55 has a plurality of projecting elements 55a on its outer circumference. These projecting elements 55a engage with recessed areas 51a formed in frame 51. Here, a relatively wide gap is maintained in the radial direction between the tips of the projecting elements 55a and the recessed areas 51a of frame 51. On the other hand, the gap in the direction of rotation is narrow. As a result, the axis of the outer ring 55 is automatically adjusted by the inner ring 56 and rollers 57. Furthermore, cam surfaces are formed on the inner circumferential surface of the outer ring 55. Moreover, the width of the outer ring 55 in the axial direction is slightly shorter than the length of the rollers 57 in the axial direction.

A switching plate 58 is accommodated inside the frame 51. This switching plate 58 has a more or less disk-form main body 58a, and a plurality of projecting elements 58b which project forward in the axial direction from main body 58a. These projecting elements 58b are formed at equal angular intervals in the circumferential direction, and the plurality of rollers 57 are positioned between adjacent projecting parts 58b. In such a state, the rollers 57 are positioned between the outer ring 55 and inner ring 56, and are capable of assuming either operating positions in which said rollers engage with the rings, or non-operating positions in which said rollers idle between the rings, as a result of being moved in the circumferential direction by the switching plate 58. The plurality of rollers 57 can be installed from the forward axial direction with respect to the switching plate 58. Moreover, when the clutch is "on", with the rollers 57 positioned in their operating positions, relative rotation between the outer ring 55 and inner ring 56 is prevented in one direction only. Meanwhile, when the clutch is "off", with the rollers 57 in their non-operating positions, the outer ring 55 and inner ring 56 are free to rotate relative to each other.

Figure 10:
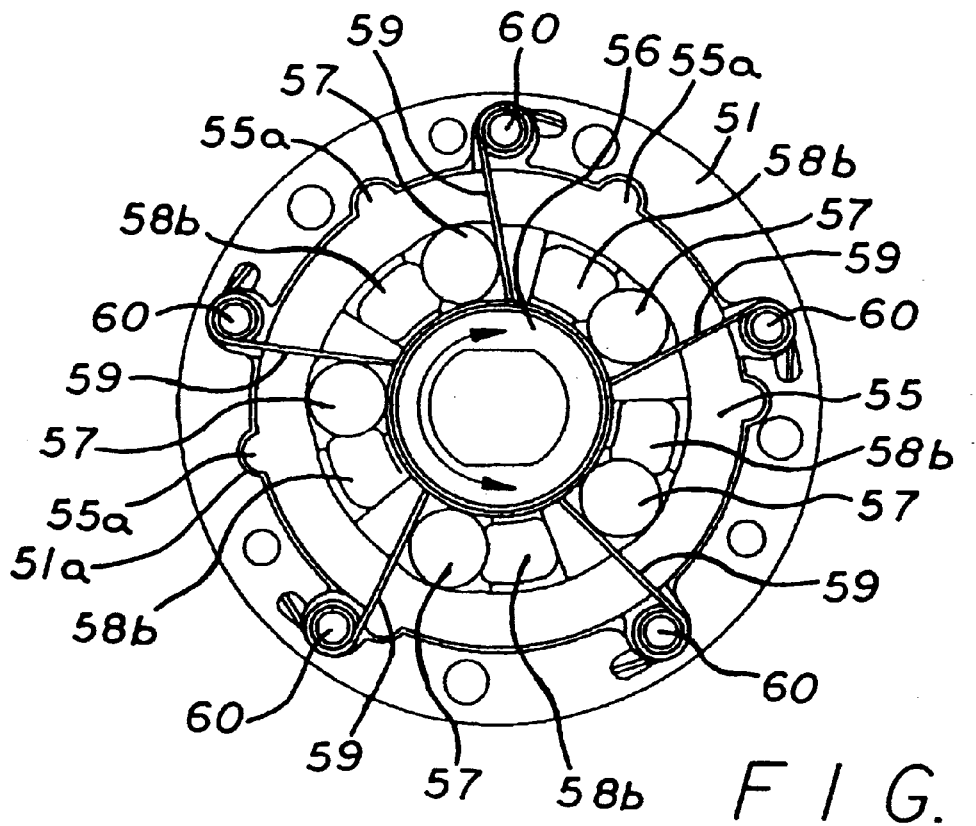
FIG. 10 is a front view of the reverse rotation prevention mechanism when the clutch is "off".
Figure 11:
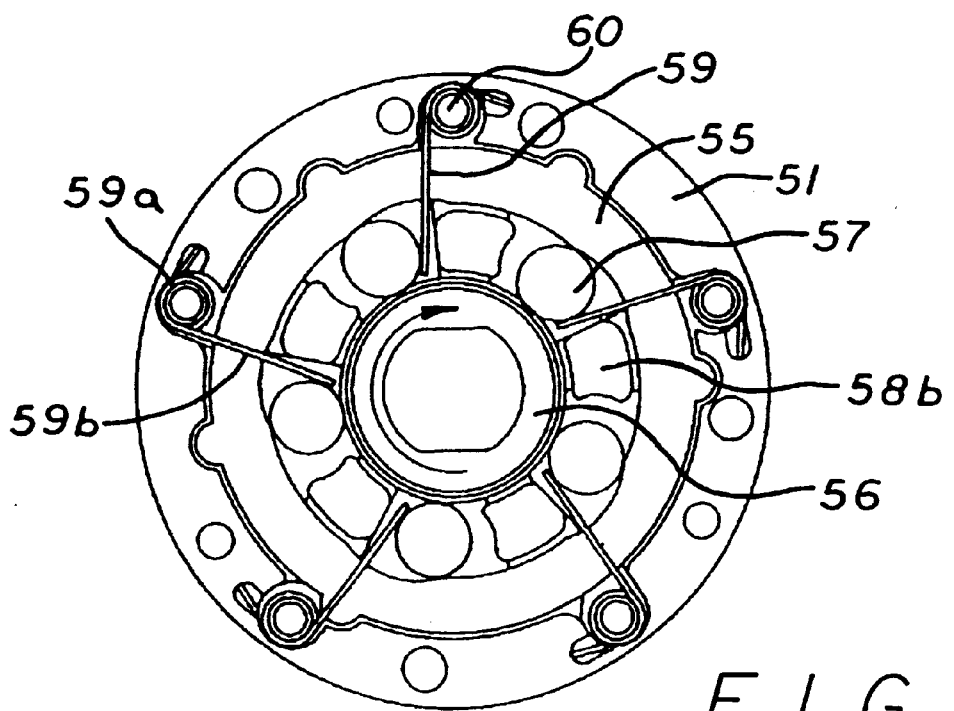
FIG. 11 is a front view of the reverse rotation prevention mechanism when the clutch is "on".

The plurality of rollers 57 are driven toward their operating positions by torsion coil springs 59. Each of these torsion coil springs 59 has a coil element 59a which is supported on a pin 60 installed on the outer circumferential portion of the frame 51, and a driving element 59b which extends inward from said coil element 59a. This driving element 59b drives the corresponding roller 57 toward its operating position. Here, when the rollers 57 are in their non-operating positions (as shown in FIG. 10), said rollers 57 are clamped by the torsion coil springs 59 and the projecting parts 58b of the switching plate 58, and are moved outward in the radial direction. As a result, the inner circumferential surfaces of the rollers 57 do not contact the outer circumferential surface of the inner ring 56. Accordingly, when the clutch is "off", the rotational resistance of the inner ring 56 is reduced, and noise is also reduced.

Here, since only the tip end portions of the torsion coil springs 59 and the roller 57 are positioned between adjacent projecting parts 58b of the switching plate 58, a large space can be maintained for the rollers 57. Accordingly, the number of rollers 57 can be increased, or the diameter of the roller 57 can be made larger, so that the capacity of the clutch can easily be increased.

The operating mechanism 53 has a switching regulating plate 61 which is installed to the rear of the switching plate 58 inside the frame 51, an operating rod 62 which is installed even further toward the rear of the frame body 51, and an operating lever 63 (see FIG. 1) which is connected to the rear end of the operating rod 62. The switching regulating plate 61 is a more or less disk-form member, and has three engaging holes 61a and an operating engaging hole 61b. Projecting parts (not shown in the figures) formed on the back surface of the switching plate 58 engage with the three engaging holes 61a, and a projecting part 62a formed on the operating rod 62 engages with the operating engaging hole 61b. Here, the operating rod 62 is installed in a range which is smaller than the outer diameter of the outer ring 55. Accordingly, the overall size of the reel can be reduced.

Figure 8:
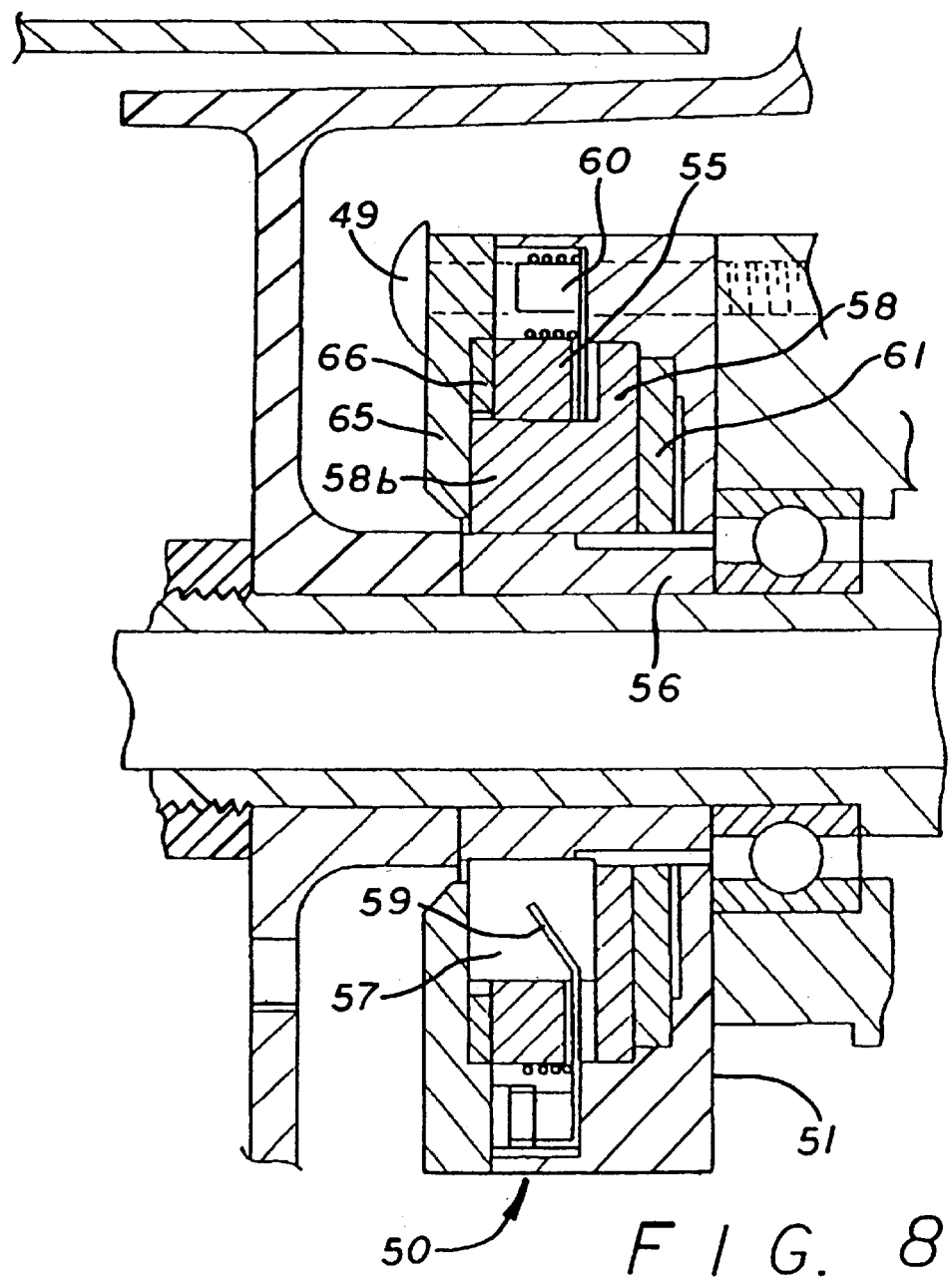
FIG. 8 is a sectional structural diagram of the reverse rotation prevention mechanism.
Figure 9:
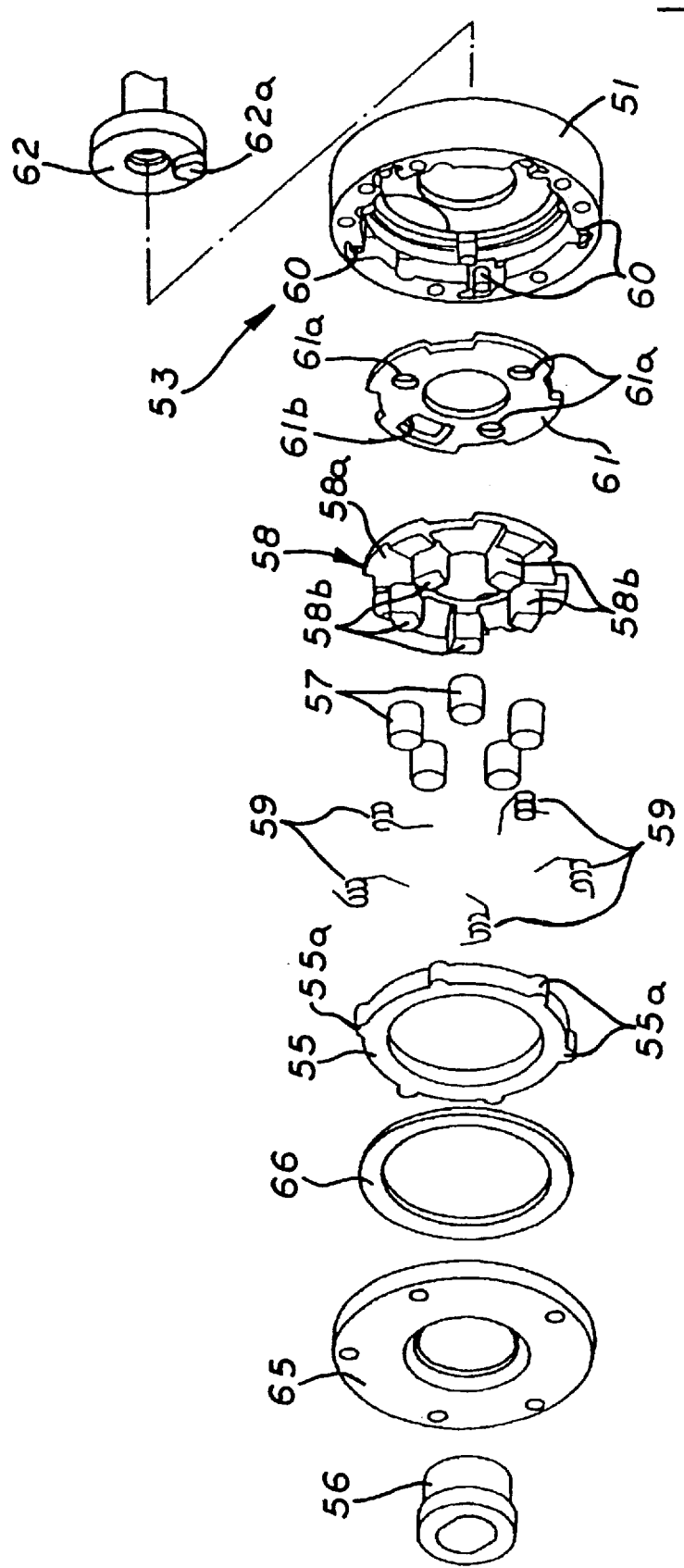
FIG. 9 is an exploded perspective view of the reverse rotation prevention mechanism.

A covering member 65 is installed forward of the outer ring 55 and rollers 57 in order to regulate the movement of said parts in the axial direction. As is shown in FIG. 8, this covering member 65 is fastened to the reel main body 1 along with the frame 51 by means of screws 49. Furthermore, a sealing member 66 is installed between the outer ring 55 and the covering member 65. This sealing member 66 is installed so that it covers the space between the outer ring 55 and the frame 51. The sealing member 66 has an outer diameter which preferably is slightly larger than the outer diameter of the outer ring 55, and also approximately the same as or slightly larger than the inner diameter of the frame 51. Sealing member 66 thus prevents sea water, etc., from entering the space between said parts.

In the inventive reverse rotation prevention mechanism, all of the constituent members can be installed from the axial direction. Accordingly, automation of the assembly process is facilitated.

The spool 4 is installed between the first arm 31 and second arm 32 of the rotor 3, and is secured on the tip end of the spool shaft 20 by a drag mechanism 70. The spool 4 has a line winding drum 4a around whose outer surface the fishing line is wound, a skirt 4b which is formed on the rear end of the line winding drum 4a as an integral part of said line winding drum 4a, and a flange plate 4c which is fastened to the front end of the line winding drum 4a. The flange plate 4c preferably is formed from a stainless steel plate material, and is mounted on the line winding drum 4a by means of fasteners such as screws 70a. In this case, the flange plate 4c is slightly bent, and the spring force created by this bending is utilized in order to insure that no gap is formed between the front end of the line winding drum 4a and the flange plate 4c when the flange plate 4c is attached. As a result, the fishing line cannot enter the area between the line winding drum 4a and the flange plate 4c.

The drag mechanism 70 has a pressing member 71 which is pressed against the inside front end surface of the spool 4. An adjustment knob 72 is used to adjust the drag force. Adjustment knob 72 rotatably engages with the tip of spool shaft 20, in which threads are defined, by means of drag nut 76 mounted in the adjustment knob 72. Pressing member 71 is affixed to adjustment knob 72 via retainer 77 and screw 78. Pins 75 are installed between pressing member 71 and adjustment knob 72, and are urged by springs 74 against the pressing member 71 in response to rotation of the adjustment knob 72. Spring 73 is installed between pressing member 71 and drag nut 76 of adjustment knob 72. Pressing member 71 does not rotate, but can move in the axial direction along spool shaft 20 in response to rotation of adjustment knob 72. A plurality of clutch plates 79 are installed between the pressing member 71 and the spool 4. In this construction, the pressing force of the pressing member 71 against the spool 4 can be adjusted by adjusting the amount of tightening of the adjustment knob 72. Accordingly, the drag force is adjustable.

During casting, the bail 43 is thrown over into the line releasing position. As a result, the first and second bail supporting members 40 and 42 rotate in the same direction about the pivoting axis M. In this case, since the first bail supporting member 40 is installed on the inner circumferential side of the first arm 31, and since the pivoting axis M is inclined with respect to the axis of rotation X as shown in FIG. 1, the first bail supporting member 40 and the line roller 41 installed at the tip of said first bail supporting member move further inward from their positions in the case of the line retrieving position. As a result, the fishing line paid out during casting is less likely to become entangled with the first bail supporting member 40 or line roller 41. Furthermore, although the pivoting axis M is inclined with respect to the axis of rotation X, both bail supporting members 40 and 42 rotate about the same pivoting axis M, and the respective planes of rotation of said bail supporting members are perpendicular to said pivoting axis M. Accordingly, smooth rotation can be accomplished without any rubbing.

During take-up of the fishing line, the bail 43 is thrown over into the line retrieving position. When the handle 2 is rotated in this state, the resulting rotational force is transmitted to the pinion gear 12 via the handle shaft and the driving gear 10. The rotational force transmitted to pinion gear 12 is then transmitted to the rotor 3 via the front portion 12a of the pinion gear 12.

Meanwhile, the screw shaft 21 is caused to rotate by the intermediate gear 23 which engages with the pinion gear 12, so that the slider 22 which engages with the grooves 21a of the screw shaft 21 moves back and forth while being guided by the guide shafts 28 and 29. As a result, the spool shaft 20 and spool 4 perform a reciprocating motion back and forth along the axis of rotation X, so that the fishing line, which is guided onto the spool 4 by the bail 43 and the line roller 41 is uniformly wound around the outer circumference of the spool 4 in the axial direction.

Furthermore, since the slider 22 performs a reciprocating motion while being guided by the guide shafts 28 and 29, the reciprocating motion can be performed smoothly without any rotation or inclination of the slider 22. Accordingly, it is not necessary for the slider main body 25 to cover the entire circumference of the screw shaft 21. As a result, the space on the opposite side from the engaging member 26 can be reduced. Accordingly, protrusion in the lateral direction can be reduced in the rear portion of the reel main body 1.

During rotation of the rotor 3, members such as the bail 43, etc., tend to cause a rotational imbalance. In the present embodiment, therefore, in order to eliminate any imbalance that might be caused by the bail supporting members 40 and 42, line roller 41 or bail 43, the rear end portions of both arms 31 and 32 are offset toward the side of the bail in the line take-up attitude. Furthermore, the bail supporting members 40 and 42 are installed so that the pivoting axis of said bail supporting members is offset toward the side of the bail in the line release attitude with respect to the axis of rotation X. Any imbalance that might arise from the line roller 41 is suppressed by installing the second bail supporting member 42 further forward than the first bail supporting member 40. Furthermore, by constructing this second bail supporting member 42 from a heavy substance which has a higher specific gravity than the other parts, it would also be possible to cause second bail supporting member 42 to function as a balancer.

During casting, etc., the rollers 57 are moved into their operating positions (FIG. 11) by means of the operating lever 63, so that the rotor 3 will not rotate in the reverse direction. Specifically, when the operating lever 63 is turned in one direction, the operating rod 62 is caused to pivot in the same direction. This force is transmitted directly to the switching regulating plate 61 via the projecting element 62a of the operating rod 62, and is further transmitted to the rollers 57 via the switching plate 58. As a result, the rollers 57 are placed in a state which allows them to move into their operating positions. When the rotor 3 rotates in the forward direction (i. e., in the fishing line take-in direction) in this state, the rollers 57 idle between the outer ring 55 and the inner ring 56. As result, rotation of the rotor 3 in the forward direction is not hindered. In this case, since the rollers 57 do not contact the outer circumferential surface of the inner ring 56 (as was described above), the rotational resistance of the inner ring 56, i. e., the rotational resistance of the rotor 3, is reduced. Furthermore, noise is also reduced. On the other hand, when the rotor 3 rotates in the reverse direction (i. e., in the fishing line pay-out direction), the rollers 57 engage with the outer ring 55 and inner ring 56, thus producing a state in which relative rotation between the two rings is impossible. Here, since the outer ring 55 is fastened to the reel main body 2 via the frame body 51, rotation of the inner ring 56, i. e., rotation of the rotor 3, is prevented in one direction (namely, the fishing line pay-out direction).

When the operating lever 63 is turned in the opposite direction from that described above, the rollers 57 are moved into their non-operating positions (FIG. 10) by an operation similar to that described above. In this state, the rollers cannot engage with the outer ring 55 and inner ring 56. Accordingly, the inner ring 56 can rotate in both the forward and reverse directions with respect to the outer ring 55, so that the rotor 3 can rotate in the fishing line pay-out direction. Here as well, the rotational resistance of the rotor 3 is reduced, and noise is also reduced.

In the reverse rotation prevention mechanism 50, the torsion coil springs 59 may also be supported on the side of the covering member 65. In this case, there is no need to install the rollers 57 against the driving force of the torsion coil springs 59, and when the covering member 65 is attached to the frame body 51, the torsion coil springs will automatically drive the rollers 57. As a result, assembly is facilitated.

What is claimed is:

1. A device for preventing the reverse rotation of a spinning reel, said device being adapted to be installed in a spinning reel in which a rotor that is used to guide a fishing line onto a spool is mounted on a reel main body so that said rotor is free to rotate, said device being useful to prevent the reverse rotation of said rotor in the line pay-out direction, said device comprising:

(i) an outer ring having an outer circumferential portion;
    (ii) an inner ring which is adapted to rotate relative to said outer ring;
    (iii) a plurality of rollers which are installed between said outer ring and said inner ring, and which are adapted to assume operating positions in which said rollers engage with said inner and outer rings, and non-operating positions in which said rollers are positioned between said inner and outer rings;
    (iv) a switching member which has a disk-form main body and a plurality of projecting elements which project in the axial direction from said main body, which are disposed directly between and are adjacent to each of said plurality of rollers and which are adapted make contact with said roller members when said roller members are in said non-operating positions; and
    (v) an operating mechanism which moves said plurality of rollers between said operating positions and said non-operating positions by causing said switching member to rotate circumferentially.

2. A device for preventing the reverse rotation of a spinning reel, as defined in claim 1, further comprising (i) a frame which supports said outer circumferential portion of said outer ring, said frame and said outer ring being in spaced relationship thereby defining a gap between said frame and said outer ring; and
    (ii) a plurality of driving members which include
        (a) supporting elements which are supported directly on said frame, and
        (b) driving elements which extend inward from said supporting elements and which drive said plurality of rollers toward said operating positions.

3. A device for preventing the reverse rotation of a spinning reel, as defined in claim 2, further comprising a cover for regulating movement of said plurality of rollers in the axial direction.

4. A device for preventing the reverse rotation of a spinning reel, as defined in claim 1, in which said outer ring and said rollers each have widths in the axial direction, and in which said width of said outer ring in the axial direction is smaller than said width of said rollers in the axial direction.

5. A device for preventing the reverse rotation of a spinning reel, as defined in claim 1, wherein said operating mechanism comprises (i) a switching regulating plate disposed behind said switching member, said regulating plate engaging said switching member, said regulating plate having defined therein an operating engaging hole, and (ii) an operating member, said operating member having an engaging element that engages with said operating engaging hole, said operating member having an operating lever.

6. A device for preventing the reverse rotation of a spinning reel, said device being adapted to be installed in a spinning reel in which a rotor that is used to guide a fishing line onto a spool is mounted on a reel main body so that said rotor is free to rotate, said device being useful to prevent the reverse rotation of said rotor in the line pay-out direction, said device comprising:

(i) an outer ring having an outer circumferential portion;
    (ii) a frame which supports said outer circumferential portion of said outer ring;
    (iii) an inner ring which is adapted to rotate relative to said outer ring;
    (iv) a plurality of rollers which are installed between said outer ring and said inner ring, and which are adapted to assume operating positions in which said rollers engage with said rings, and non-operating positions in which said rollers are positioned between said rings;
    (v) a switching member which has a disk-form main body and a plurality of projecting elements which project in the axial direction from said main body and which are disposed directly between each of said plurality of rollers, and which is used to move said plurality of rollers in the circumferential direction;
    (vi) a plurality of driving members which have supporting elements which are supported on said frame and driving elements which extend inward from said supporting elements and which drive said plurality of rollers toward said operating positions; and
    (vii) an operating mechanism which moves said plurality of rollers between said operating positions and said non-operating positions by causing said switching member to rotate in the circumferential direction.

7. A device for preventing the reverse rotation of a spinning reel, as defined in claim 6, wherein said operating mechanism comprises (i) a switching regulating plate disposed behind said switching member, said regulating plate engaging said switching member, said regulating plate having defined therein an operating engaging hole, and (ii) an operating member, said operating member having an engaging element that engages with said operating engaging hole, said operating member having an operating lever.

8. A spinning reel comprising:

(i) a reel main body,
    (ii) a rotor having a cylindrical element,
    (iii) a spool affixed to said rotor,
    (iv) a rotor driving mechanism comprising a handle, a driving gear, and a pinion gear to which said rotor is affixed, and disposed within said cylindrical element of said rotor,
    (v) a device for preventing the reverse rotation of said rotor, said device comprising
        (a) an outer ring having an outer circumferential portion;

(b) an inner ring which is adapted to rotate relative to said outer ring;

(c) a plurality of rollers which are installed between said outer ring and said inner ring, and which are adapted to assume operating positions in which said rollers engage with said inner and outer rings, and non-operating positions in which said rollers are positioned between said inner and outer rings;

(d) a switching member which has a disk-form main body and a plurality of projecting elements which project in the axial direction from said main body and which are disposed directly between each of said plurality of rollers; and (e) an operating mechanism which moves said plurality of rollers between said operating positions and said non-operating positions by causing said switching member to rotate circumferentially, wherein said outer ring is mounted on said reel main body, and said inner ring is mounted on said pinion gear.

9. A device for preventing the reverse rotation of a spinning reel, as defined in claim 8, wherein said operating mechanism comprises (i) a switching regulating plate disposed behind said switching member, said regulating plate engaging said switching member, said regulating plate having defined therein an operating engaging hole, and (ii) an operating member, said operating member having an engaging element that engages with said operating engaging hole, said operating member having an operating lever.

10. A spinning reel comprising:

(i) a reel main body, (ii) a rotor having a cylindrical element, (iii) a spool affixed to said rotor, (iv) a rotor driving mechanism comprising a handle, a driving gear, and a pinion gear to which said rotor is affixed, and disposed within said cylindrical element of said rotor, (v) a device for preventing the reverse rotation of said rotor, said device comprising (a) an outer ring having an outer circumferential portion;

(b) a frame which supports said outer circumferential portion of said outer ring;

(c) an inner ring which is adapted to rotate relative to said outer ring;

(d) a plurality of rollers which are installed between said outer ring and said inner ring, and which are adapted to assume operating positions in which said rollers engage with said rings, and non-operating positions in which said rollers are positioned between said rings;

(e) a switching member which has a disk-form main body and a plurality of projecting elements which project in the axial direction from said main body and which are disposed directly between each of said plurality of rollers, and which is used to move said plurality of rollers in the circumferential direction;

(f) a plurality of driving members which have supporting elements which are supported on said frame and driving elements which extend inward from said supporting elements and which drive said plurality of rollers toward said operating positions; and (g) an operating mechanism which moves said plurality of rollers between said operating positions and said non-operating positions by causing said switching member to rotate in the circumferential direction, wherein said frame is affixed to said reel main body, and said inner ring is mounted on said pinion gear.

11. A device for preventing the reverse rotation of a spinning reel, as defined in claim 10, wherein said operating mechanism comprises (i) a switching regulating plate disposed behind said switching member, said regulating plate engaging said switching member, said regulating plate having defined therein an operating engaging hole, and (ii) an operating member, said operating member having an engaging element that engages with said operating engaging hole, said operating member having an operating lever.

\* \* \* \* \*